UNITED STATES PATENT OFFICE.

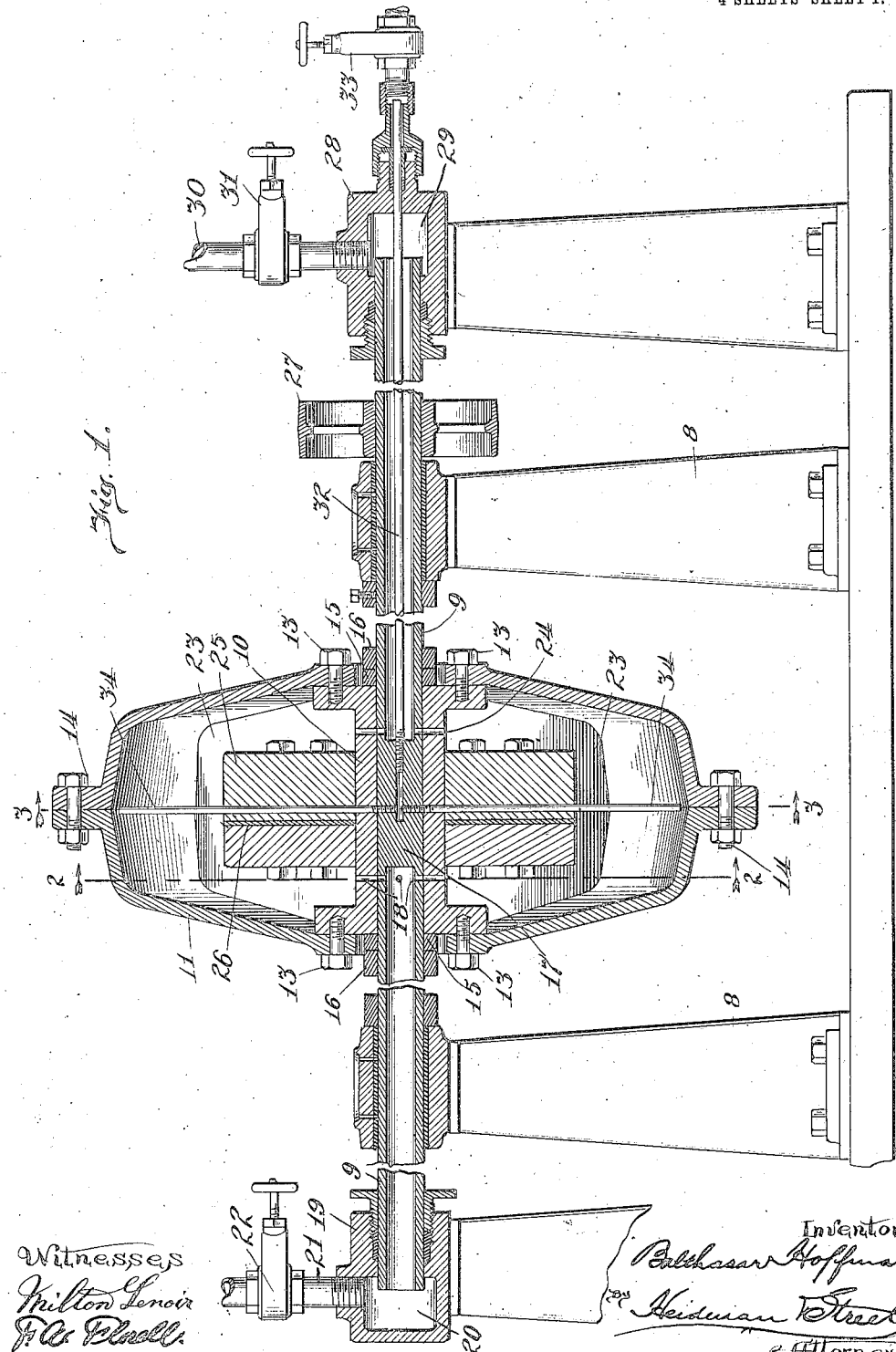

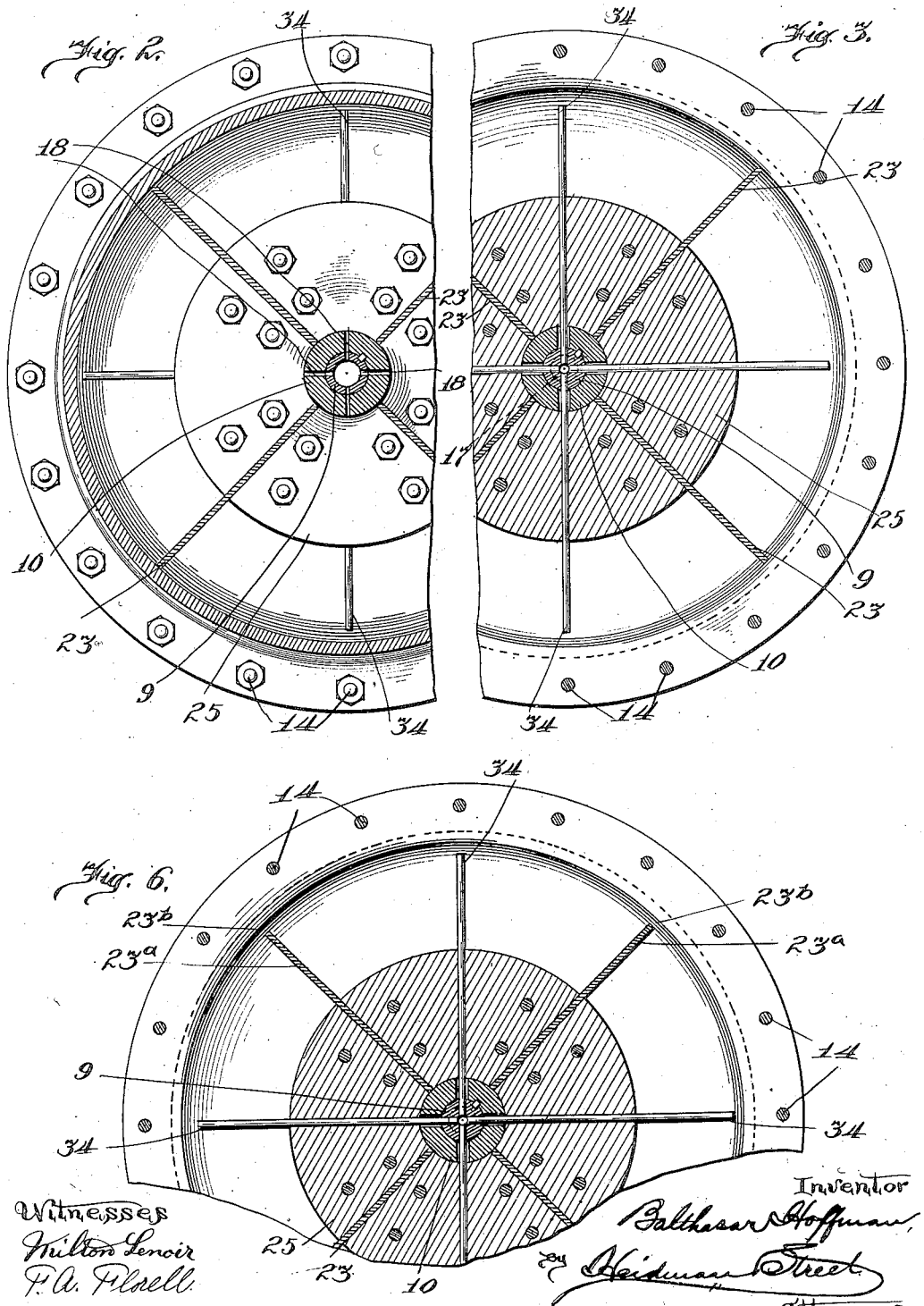

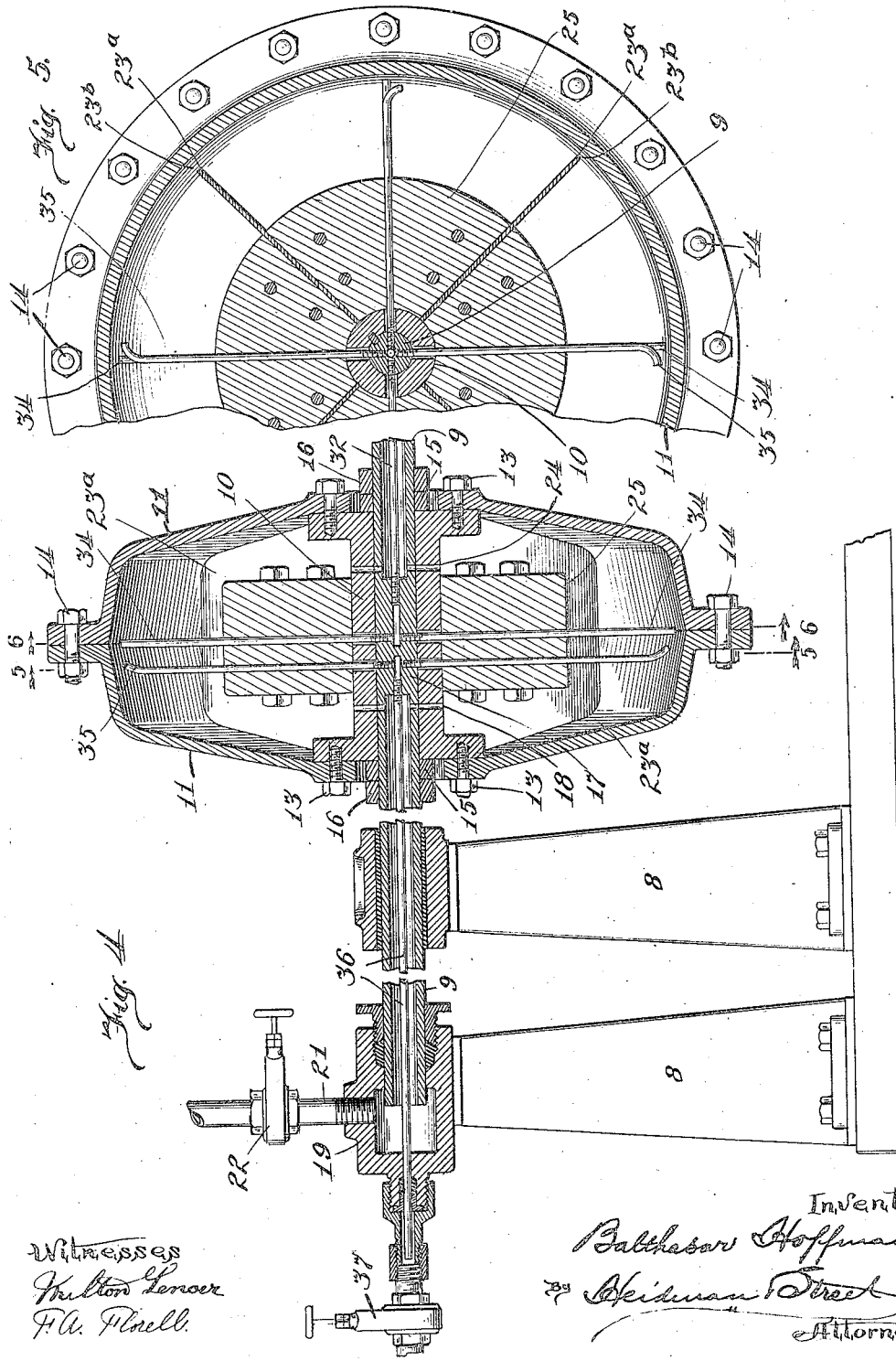

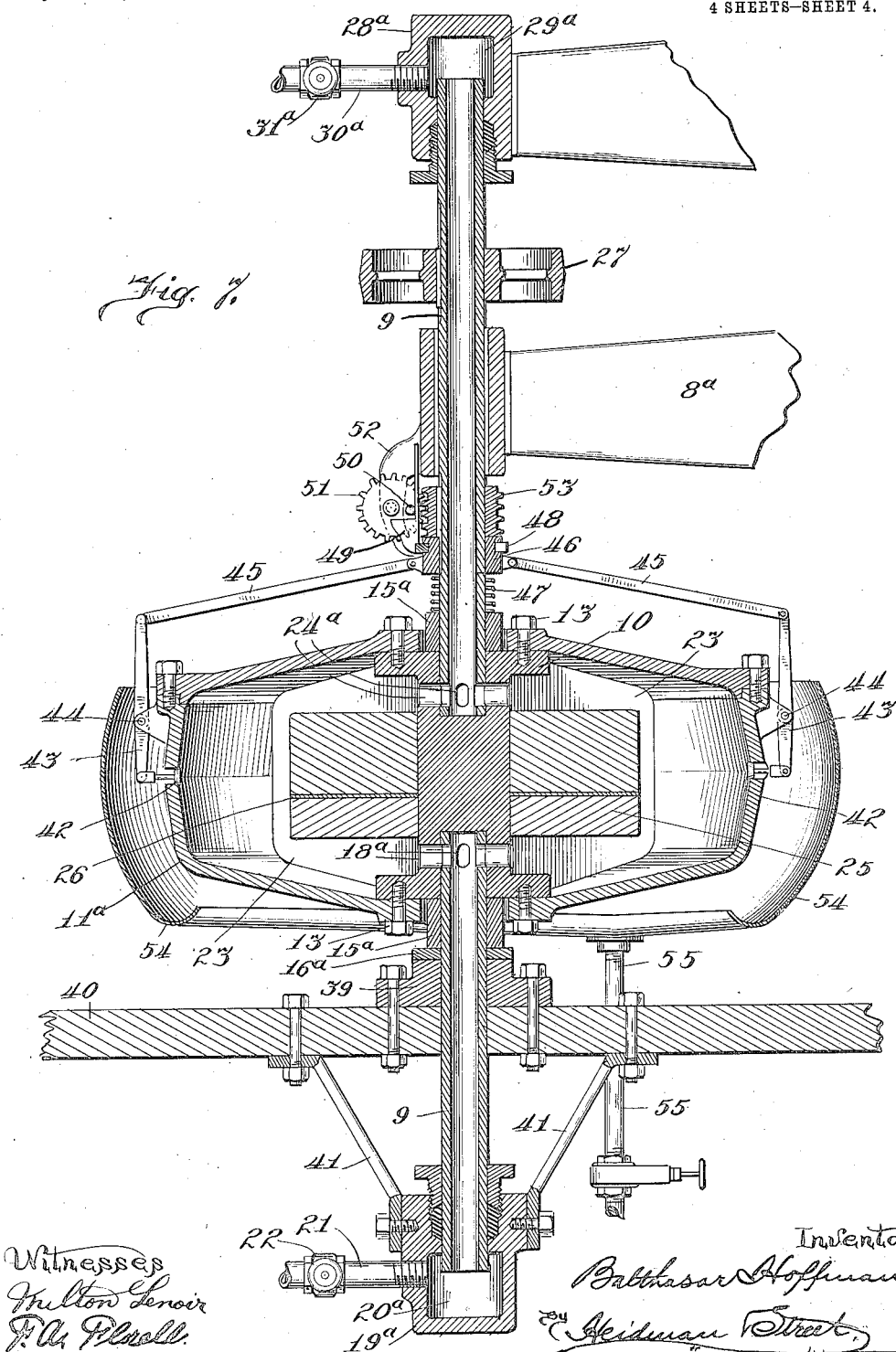

BALTHASAR HOFFMAN, OF TOPEKA, KANSAS.

CENTRIFUGAL SEPARATING-MACHINE.

1,101,548.  Specification of Letters Patent.  Patented June 30, 1914.

Application filed October 21, 1911. Serial No. 655,843.

*To all whom it may concern:*

Be it known that I, BALTHASAR HOFFMAN, a citizen of the United States, and resident of Topeka, in the county of Shawnee and State of Kansas, have invented certain new and useful Improvements in Centrifugal Separating-Machines, of which the following is a description, reference being had to the accompanying drawings, which form a part of my specification.

My invention relates to a machine wherein centrifugal force is employed to cause a separation of the constituents of a mixture which are of different specific gravity, that is, a machine wherein the heavier particles will be separated from the lighter through centrifugal action; as for example, the separation of solids or sediment from water, oil from water, tar or other solids from a gas, or possibly a gas from a gas where the respective densities of the two vary considerably, or in connection with other fluids; the application of the machine to the different uses being readily apparent from the following detailed description.

In the drawings:—Figure 1 is a longitudinal sectional view of the preferred form of my device. Fig. 2 is a vertical sectional view taken on the line 2—2 of Fig. 1, looking in the direction of the arrows. Fig. 3 is a similar sectional view taken on the line 3—3 of Fig. 1, looking in the direction of the arrows. Fig. 4 is a longitudinal sectional view showing a modified form of my invention, a portion of the supporting mechanism and communicating pipes being broken away. Fig. 5 is a vertical sectional view taken on the line 5—5 of Fig. 4. Fig. 6 is a similar view taken on the line 6—6 of Fig. 4. Fig. 7 is a longitudinal sectional view of still another modified form of my invention wherein the machine is illustrated as of a vertical type.

My invention consists more particularly in providing a rotary vessel having suitable means whereby the liquid or substance to be treated can be conducted into the vessel, at a point at or in proximity to its axis, while the vessel is rotated at proper speed, so that the centrifugal force may separate the elements of different specific gravity; and consists further in means whereby the separated elements may be withdrawn or discharged from the vessel while the machine is in operation, as will more clearly be understood from the following description, wherein the preferred form of my invention, as illustrated in Fig. 1, will first be described.

Suitably mounted in proper bearings in the brackets or pedestals 8, 8, is a shaft 9, to which is rigidly secured, by a key or otherwise, a hub 10, to the flanges of which are bolted, or otherwise secured, the two walls or halves of the separating vessel 11. Both walls or members of the vessel 11 are provided with the central opening for the passage of the shaft 9, as clearly indicated in Fig. 1; and vessel 11 is secured to the hub by the studs 13, of which any suitable number are employed; while the two halves or members of vessel 11 are preferably secured together by bolts 14 which pass through the circumferential flange with which the walls or members are shown provided. In order to prevent the longitudinal movement of the hub 10 and vessel 11 on the shaft, I provide the sleeves 15, 15, and the collars 16, 16, which latter may be held into place by set screws or other suitable means. Shaft 9 is preferably hollow substantially throughout its length, with the exception of a portion which would lie within the vessel 11, where the shaft is provided with a partition or plug as at 17, thus preventing a direct flow from one end of the shaft to the other. Shaft 9 and hub 10 are both provided with the registering ports or passages 18 whereby communication from the adjacent end of the shaft into the vessel may be had. The outer left hand end of shaft 9 is provided with a stuffing box 19, having a chamber 20 with which pipe line 21 communicates; this pipe being shown provided with a suitable valve as at 22, whereby the flow of liquid or substance into chamber 20 of the stuffing box may be controlled. The stuffing box is, of course, provided with suitable glands and so secured at the end of the shaft as to produce a fluid tight joint.

The vessel 11 is preferably shown provided with partitions 23, 23, whereby the interior of the vessel is divided into the desired number of compartments; it being understood that the number of compartments and number of ports 18 must in any event correspond, so that the liquid or substance may be allowed to pass into all of the compartments, as can be seen for example in Fig. 2. To the opposite side of the partition or plug 17 within the shaft 9, I provide the hub and shaft with registering ports 24; it being understood, of course, that the number of ports 24 must at least correspond in number with the compartments within the vessel.

Intermediate of ports 18 and 24, and rigidly secured to the hub, I provide an annular filling block or baffle member 25, of any suitable material, whose diameter is considerably less than the inside diameter of the vessel, as clearly shown. This block or baffle member may be secured in place in any suitable manner, as for example, by bolting to the web 26 which radiates from hub 10.

Shaft 9 is shown provided with a pulley 27, whereby the shaft may be rotated through power obtained from any suitable source, or any other suitable means may be employed for revolving the shaft. The other or free end of shaft 9, is also shown provided with a stuffing box 28, with chamber 29 of which the end of the shaft communicates; the stuffing box also being provided with a pipe 30 having a suitable valve as at 31.

Extending through the stuffing box 28 and into the shaft 9 is a smaller tube or pipe 32, the outer end of which is shown provided with a valve 33; any suitable mechanism being employed to provide a fluid tight joint. The inner end of pipe or tube 32 communicates with the radially extending tubes or pipes 34, which lead from within shaft 9 to a point in proximity to the maximum inner periphery of the vessel as clearly shown in Figs. 1 and 3. It is understood, that the number of tubes 34 should at least correspond in number with the number of compartments within the vessel.

In the operation of my improved machine, the vessel is revolved at proper speed by the rotation of shaft 9, and the liquid or mixture to be treated is fed through pipe 21, into chamber 20, and thence through shaft 9, and through the ports 18 into the various compartments of the vessel. As it is important to prevent leakage, I prefer that the stuffing box 19 be stationarily mounted as indicated in the drawings; suitable glands and means for securing them in place being employed. It is evident that unless means were employed to compel the liquid to flow away from the axis of the vessel and toward the walls of the vessel so as to be given rotary motion, a portion thereof would fail to be affected by the centrifugal force. As it is evident from the construction shown and described, that portion of the liquid or mixture having greater specific gravity will be moved toward and be held in close proximity to the maximum diameter of the vessel interior, while that portion of the liquid which is of less specific gravity, will, of course, remain in close proximity to the center or axis of the vessel. As the vessel becomes filled, the lighter material or liquid will be withdrawn through ports 24, into hollow shaft 9 and be discharged into chamber 29 of stuffing box 28 from whence it may be discharged into any suitable receptacle through pipe 30. The heavier portion of the impure mixture, namely that portion which, through the action of centrifugal force, will be thrown toward the portion of the vessel farthest removed from the shaft, will be taken or drawn off through tubes or pipes 34 and into the concentric tube or pipe 32, to be discharged into any suitable vessel or allowed to escape. If it is desired to preserve the heavier separated portion and control its outward flow, the same may be accomplished by a valve shown at 33; as for example, in the separation of oil from water, the separated water would be taken off through pipes 34 and 32, to be discharged through valve 33, while the oil, of lighter specific gravity, would flow through ports 24 into the right hand end of hollow shaft 9 and be discharged through pipe 30. This outlet may also be controlled by a suitable valve mechanism as at 31. In the use of my invention for the purification of water, that is, in the separation of the sediment or other solids therefrom, it is understood that the sediment or heavier material will pass through pipes 34 and 32 and be allowed to waste, while the separated or purified water will, of course, flow through ports 24 and out through the right hand end of hollow shaft 9 and into chamber 29 of stuffing box 28. In the event of too great a back pressure on the discharge pipes,—thus interfering with the proper taking off of the separated substance,—suitable pumps may be connected with both discharge orifices and the separated substance pumped or drawn out of the vessel. It is evident that with the construction shown and described, either a continuous or intermittent centrifugal separating machine may be had. By providing the outlet orifices of pipe 32 and stuffing box 28 with suitable valves, any desired quantity of mixture may be separated.

By providing the vessel with the partitions 23, it is evident that these partitions tend to cause the liquid or substance to travel at the same rotational velocity as the vessel itself; it is apparent that with these baffle members or partitions, the inertia of the mixture or fluid, that is, the tendency to maintain its course or direction of flow, will assist the operation of the machine and materially reduce the power required for its operation.

When using the machine with certain fluids or mixtures, it may be found that the heavier matter or sediment will crowd itself at the juncture of the partitions and wall of the vessel, that is, at the maximum periphery of the vessel, so that it may be difficult to withdraw this matter. In order to overcome this difficulty, the machine may be constructed as shown in Fig. 4, wherein the partitions 23ª are so constructed as to provide suitable openings or passages between the outer ends of the partitions and the walls of the vessel as shown at 23ᵇ, thereby allowing communication between the different compartments of the vessel, and permit a certain amount of the retained liquid or substance to creep or flow at the inner periphery and thus cause an agitation of the heavier portion of the retained liquid. In order to induce or insure a thorough agitation of this heavier portion of the substance or liquid within the vessel, tubes or pipes 35 may be inserted. These pipes 35 are preferably made to extend into the hub 10 and the partition or plug within the hollow shaft 9, where they connect with a tube or pipe 36 which extends through stuffing box 19 and the left hand side of hollow shaft 9. The outer end of pipe 36 is shown provided with a suitable valve as at 37, whereby the flow of liquid may be controlled.

With the construction shown in Fig. 4, which in every other respect is similar to the construction shown in Fig. 1, except for the features just above described, if it is found that the heavier material, or a portion thereof, tends to adhere to the inner circumference of the vessel, a flow of water may be admitted through pipe 36 and into pipes 35, (the outer ends of which are curved so as to discharge the water in a somewhat tangential manner) thereby stirring up or agitating the heavier material and causing it to discharge through take-off tubes or pipes 34. Instead of employing the take-off or discharge pipes shown in Figs. 1 and 4, the manner of discharging the heavier portions shown in Fig. 7 may be employed. In this construction, the heavier matter is intended to be discharged through the wall of the vessel at the point of its greatest diameter.

As an illustration of the fact that my improved machines may be arranged either horizontally or vertically, I have shown the machine arranged in a vertical position in Fig. 7. In this construction, the vessel 11ᵃ is preferably constructed in a manner similar to that shown in Figs. 1 and 4, and the vessel may be provided with or without the partitions 23, extending and connecting throughout with the wall of the vessel, or the partitions may be as shown at 23ᵃ in Figs. 4 and 5, when it is desired to induce agitation of the heavier matter adjacent to the wall of the vessel. The hub 10 and vessel 11ᵃ are held against longitudinal movement on the hollow shaft 9 by the sleeve 15ᵃ which rests on the collar 16ᵃ, the latter being supported by the block 39 which is properly bolted or otherwise secured to the support 40. The lower end of shaft 9 is provided, as in the construction shown in Fig. 1, with the stuffing-box 19ᵃ having the chamber 20ᵃ with which the pipe 21 connects; the flow through the pipe being controlled by the valve 22. In this construction, I show the stuffing-box 19ᵃ held in proper position by brackets 41, which latter may be bolted to the under side of the support 40. The upper end of shaft 9 is suitably supported in proper bearings provided in the ends of the bracket, and is also provided with the pulley 27; while the extreme upper end of the shaft is provided with the stuffing-box 28ᵃ having the chamber 29ᵃ, into which the upper end of shaft 9 extends, or with which it communicates. Pipe 30ᵃ may be provided with a suitable valve 31ᵃ, so that the flow from shaft 9 may be controlled if desirable.

The construction of the machine as thus far described may be identical with those shown in Figs. 1 and 4, and previously described.

Circumferentially arranged about the periphery of vessel 11ᵃ, and preferably at the point of its greatest diameter, are suitable outlets or valves 42. These valves are preferably made to open inwardly and thus prevent their accidental opening by the material within the vessel through the action of centrifugal force. Connected with the stems of the valves are pivoted levers 43 which have pivotal bearings as at 44 on a lug, which may be cast integral with a wall of the vessel. Secured to the outer ends of levers 43 are the levers 45, which in turn are pivotally connected with a sleeve 46 arranged to have longitudinal movement on shaft 9. The sleeve 46 being held in its upward or normal position by a spring 47, which is seated on collar 15ᵃ, which latter bears against the end of hub 10, as clearly shown. The sleeve 46 is shown provided with a circumferential groove into which may be fitted collar 48. This collar may be provided with the upwardly extending lug 49, which is adapted to be engaged by the pin 50 secured to gear 51. Gear 51 is held in proper position by the bracket 52, which may be made integral with the bearing portion of bracket or standard 8ᵃ, as shown. The gear 51 is made to mesh with the worm gear 53, which is properly keyed to shaft 9 to revolve therewith, so that when the shaft 9 is rotated, and with it worm gear 53, gear 51 will be rotated, thereby bringing pin 50 against lug 49 and compel it to move out of the path of the pin; pressing on the lug will compel sleeve 46, through the medium of collar 48, to move downwardly against the action of spring 47. The downward movement of sleeve 46 will push levers 45 outward, thereby tilting levers 43, which in turn will open valves 42 inwardly.

I have shown vessel 11ᵃ provided with the baffle member or block 25, secured to the shaft in the manner previously described in connection with Fig. 1, and have also shown the vessel divided into compartments by the partitions 23. Where the vessel is divided into compartments, it is evident that one or more valves 42 must be provided for each of the compartments so that the material or substance may be discharged at the inner periphery of each compartment; where the partitions 23 are provided with the peripheral passage as shown in Fig. 5 at 23ᵇ, so as to induce agitation of the heavier matter, a less number of valves, as at 42, may be employed. In the operation of this construction, pipe 21 may act as the inlet pipe, so that when valve 22 is opened, liquid may be forced into chamber 20ᵃ and made to pass upward through hollow shaft 9, through the ports 18ᵃ, into the various compartments of vessel 11ᵃ. The baffle member 25 will, as previously described, compel the liquid to move away from shaft 9 and be acted on by centrifugal force, so that the heavier material will move toward the periphery of the vessel and collect at the point of greatest diameter, while the lighter material will move about baffle member 25, and flow out through ports 24ᵃ and be discharged at the upper end of hollow shaft 9, passing out through pipe 30ᵃ. With the machine in operation, it is evident that worm gear 53 will rotate gear 51 and thereby compel the pin 50 to periodically engage lug 49, thereby moving sleeve 46 downward and operate levers 43 and 45, so that valves 42 will be opened at predetermined or intermittent intervals and allow the heavier material to be discharged therefrom. If desired, a thorough agitation of the heavier matter may be caused by the use of the pipes 35 previously described and shown in Figs. 4 and 5.

In order that the discharged material may be collected and prevented from flying about, I provide a collecting shield 54 of suitable construction, so formed that the material will flow to or be concentrated at a point where the shield may be provided with a discharge pipe as at 55.

Instead of employing the mechanism whereby the valves will be automatically or mechanically operated at predetermined intervals, it is evident that levers 45 may be controlled by manually operated mechanism, so that the intermittent opening of valves 42 may be timed by the operator, to suit different conditions.

It is evident that after pin 50 passes lug 49, spring 47 will move sleeve 46 upward to its normal position against worm gear 53, ready to be again actuated when gear 51 has revolved a predetermined degree. Should it be desired to cause a more frequent mechanical or automatic opening of valve 42, gear 51 may be provided with additional pins 50; the pins being so placed that the operation of the valves may be properly timed; or the valves may be manually operated and the operating means dispensed with.

I have shown and described the concentrating vessel provided with a number of partitions whereby the interior of the vessel is divided into a number of compartments, but it is evident that the machine may be employed without the dividing partitions when it is so desired; and it is apparent that the machine may be altered in a number of details without departing from the spirit of my invention; for example, I have illustrated different ways of effecting the discharge of the heavier portions of the contents, as well as means whereby the heavier matter may be agitated without altering or affecting the general operation and construction of my machine, and I do not wish to be understood, therefore, as limiting myself to the exact constructions shown and described, but

What I claim as my invention and wish to secure by Letters Patent, is:—

1. A centrifugal separator, comprising a rotatable hollow shaft provided with a plurality of radially extending openings communicating with the longitudinal passage in the shaft, said shaft being provided with a partition or plug intermediate of the different series of ports whereby direct passage through the shaft is prevented, a stuffing box arranged at each end of the shaft, provided with valve-controlled conduits communicating therewith, one end of the shaft constituting a supply end and the other a discharge-end, a closed vessel mounted on said shaft to rotate therewith and inclosing said radially extending openings, a baffle-member secured to the shaft at a point intermediate of two series of said radial openings in the shaft and of less diameter than the maximum diameter of the vessel, radially extending partitions whereby the vessel interior is divided into a number of compartments, and a conduit within said hollow shaft and of less diameter than the shaft-interior, said conduit being provided with a series of radially extending ramifications extending into proximity to the inner periphery of the vessel at the point of its maximum diameter whereby the separated heavier material will be taken from the vessel and separately conveyed through the discharge end of said shaft.

2. A centrifugal separator, comprising a rotatable hollow shaft provided with a plurality of radially extending openings communicating with the longitudinal passage in the shaft, said shaft being provided with a partition or plug intermediate of the different series of ports whereby direct passage through the shaft is prevented, a stuffing-box, arranged at each end of the shaft, provided with valve-controlled conduits communicating therewith, one end of the shaft constituting a supply end and the other a discharge end, a closed vessel mounted on said shaft to rotate therewith and inclosing said radially extending openings, a baffle member secured to the shaft at a point intermediate of two series of said radial openings in the shaft and of less diameter than the maximum diameter of the vessel, radially extending partitions whereby the vessel interior is divided into a number of compartments, a conduit within the hollow shaft and of less diameter than the shaft interior, said conduit being provided with a series of radially extending ramifications extending into proximity to the inner periphery of the vessel at the point of its maximum diameter whereby the separated heavier material will be taken from the vessel and separately conveyed through the discharge end of said shaft, and a conduit, of less diameter than the shaft interior, extending through the supply-end of the shaft and provided with radially extending ramifications extending into proximity to the inner periphery of the vessel at the point of its maximum diameter, the outer or discharge ends of said ramifications being so arranged that the fluid discharged therefrom will be directed in a direction opposite to the rotation of the vessel whereby differential movement of the heavier material is induced and the discharge of said material through the first mentioned conduit insured.

BALTHASAR HOFFMAN.

Witnesses:
CLARENCE LESSELS,
E. E. CHAPMAN.